May 22, 1962  D. W. HANSON  3,035,276
COMBINATION FORM AND FAUCET ASSEMBLY ADAPTER
Filed May 24, 1960  2 Sheets-Sheet 1
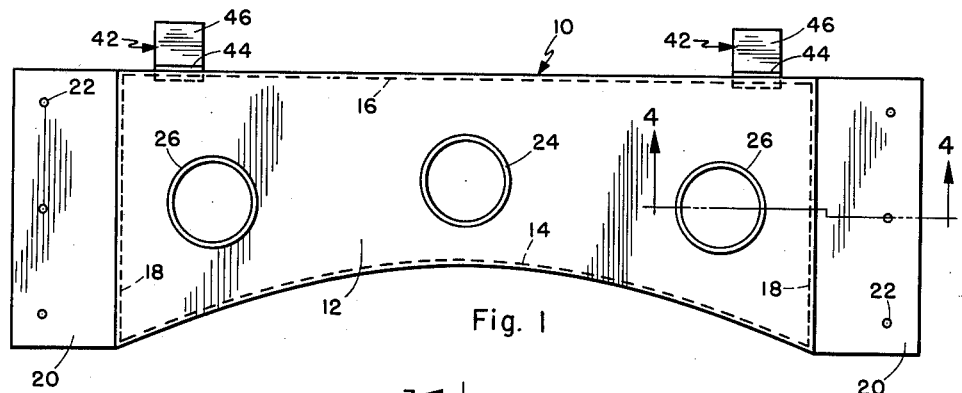
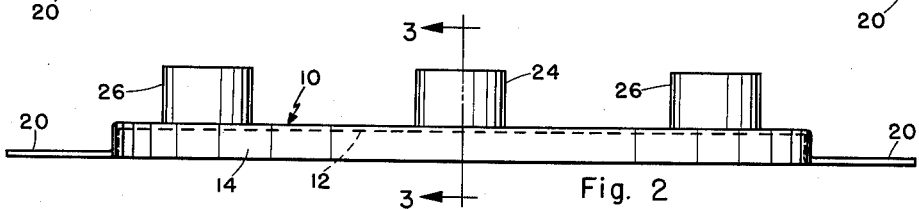
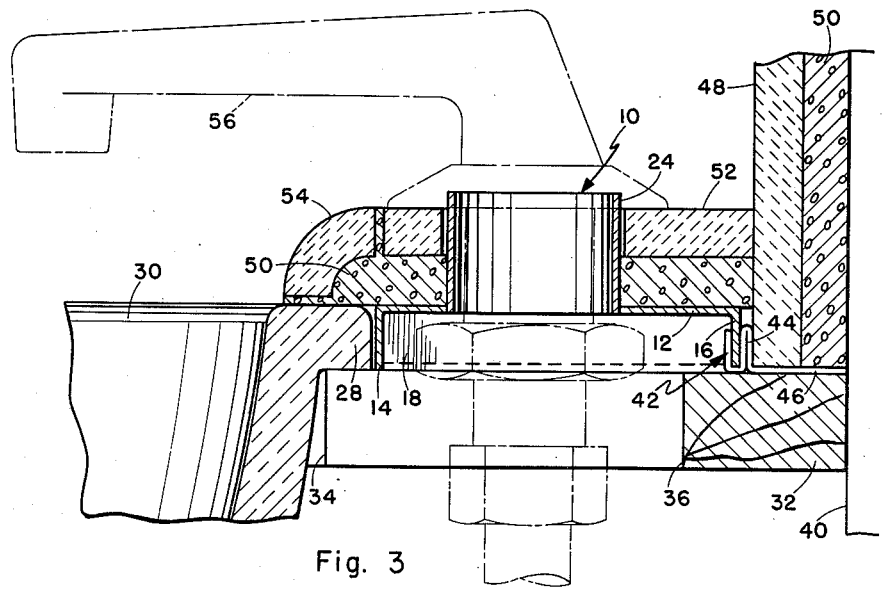
*INVENTOR.*
DAVID W. HANSON
BY
*Knox & Knox*

May 22, 1962 D. W. HANSON 3,035,276
COMBINATION FORM AND FAUCET ASSEMBLY ADAPTER
Filed May 24, 1960 2 Sheets-Sheet 2

INVENTOR.
DAVID W. HANSON
BY
Knox & Knox

United States Patent Office 3,035,276
Patented May 22, 1962

3,035,276
COMBINATION FORM AND FAUCET ASSEMBLY ADAPTER
David W. Hanson, 3382 Redwood, San Diego, Calif.
Filed May 24, 1960, Ser. No. 31,417
3 Claims. (Cl. 4—191)

The present invention relates generally to plumbing accessories and more particularly to a combination form and adapter for faucet installation.

The primary object of this invention is to provide a combination form and adapter for installation of a faucet assembly in a tiled counter, or similar structure, where the counter itself is too thick to allow proper installation of conventional faucets and associated plumbing due to insufficient length of threaded parts, the currently popular use of thick tile and terrazzo slabs being contributive to problems adeptly solved by this invention.

Another object of this invention is to provide a combination form and adapter which ensures proper positioning of the plumbing fixtures.

Another object of this invention is to provide a combination form and adapter which is fixed directly to the counter over a simple cut-out to clear the plumbing fixtures, the form serving as a guide and support for the mud and tile to be placed around the fixtures.

A further object of this invention is to provide a combination form and adapter having spacing clips which space the adapter from the wall at the correct position for installation of backsplash tiling on the wall.

Finally, it is an object to provide a combination form and adapter of the aforementioned character which is simple and convenient to make and use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a top view of the combination form and adapter;

FIGURE 2 is a front elevation view thereof;

FIGURE 3 is an enlarged sectional view taken on the line 3—3 of FIGURE 2, certain surrounding structure being indicated in section and a plumbing fixture in broken line to illustrate the installation;

Similar characters of reference indicate similar or identical elements and portions throughout the specification and throughout the views of the drawing.

Figure 4:
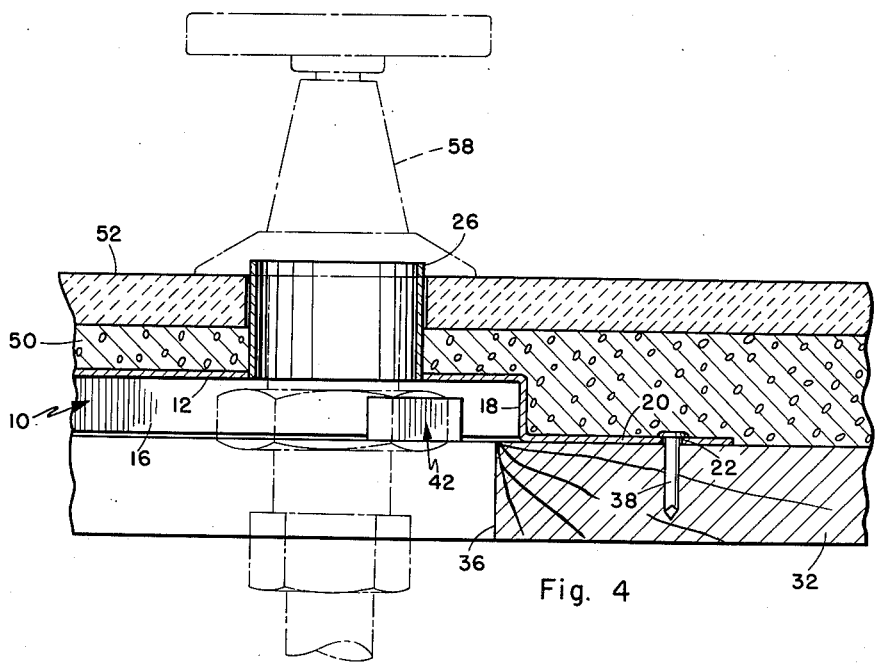
FIGURE 4 is an enlarged fragmentary sectional view taken on the line 4—4 of FIGURE 1 and including surrounding structure.

Referring now to FIGURES 1-5 of the drawings, the combination form and adapter, hereinafter referred to as the adapter 10, is a simple sheet metal structure pressed or drawn to shape and soldered or welded at the various seams in a conventional manner. Alternatively, the adapter may be injection molded, or at least partially extrusion molded, from plastic material, which may be desirable from the viewpoint of moisture resistance. The adapter 10 has a top plate 12 with a downwardly extending skirt comprising a front flange 14, rear flange 16 and end flanges 18, the lower edges of said end flanges having outwardly turned, horizontal attachment plates 20, each provided with screw or nail holes 22. Fixed on the top plates 12 are three upright, cylindrical sleeves, a center sleeve 24 and a pair of side sleeves 26 spaced equally on either side thereof. The sleeves are selectively aligned with an equal number of openings in the top plate 12 and are spaced to suit the standard positioning of conventional units such as faucets and a common spout in a household hot and cold water mixer assembly. The height of the flanges 14-18 is such that the top plate 12 is raised to substantially the level of the rim 28 of the plumbing fixture such as the lavatory 30 fragmentarily illustrated in FIGURE 3. While the plumbing fixture 30 is indicated as of an ovoid shape and the front flange 14 curved to match the rim contour, it should be understood that the adapter may also be made with a straight front face for rectangular type basins, sinks and the like.

Figure 5:
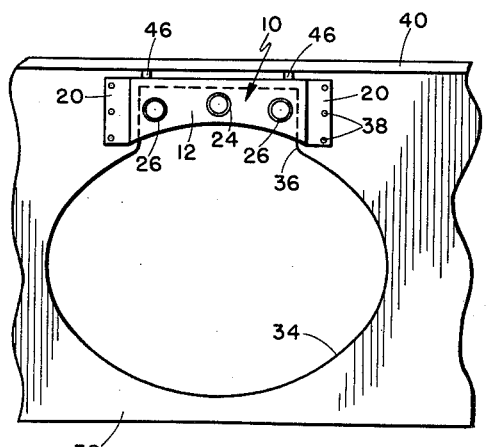
FIGURE 5 is a top plan view, on a reduced scale, showing the positioning of the adapter on a counter top.

The adapter is designed for use on certain all-wooden counters, stone slab counters or similar thick structures which are usually tiled. In this type of installation the wooden counter base indicated at 32 in FIGURES 3-5, is provided with an opening 34 to receive the fixture 30, the opening being dimensioned so that the rim 28 of said fixture rests on the edge thereof. Counters of the mentioned type may be too thick for proper installation of plumbing fixtures without extensive undercutting of the counter, which is difficult in confined quarters. With the adapter 10, a simple rectangular notch 36 is cut at the rear of the opening 34 to provide clearance for plumbing through the thickness of the counter, the adapter being placed over the notch and secured by suitable nails 38, or the like. If the wall 40 at the rear of the counter is pre-finished, the adapter 10 may be placed against the wall. If, however, the wall is to be tiled as illustrated, spacing clips 42 are attached to the rear flange 16 to locate the adapter 10 in the proper position. The spacing clips 42 have return folded portions 44 which fit tightly over the rear flange 16, and are provided with tabs 46 extending rearwardly to the wall 40. The length of the tabs 46 is substantially equal to the combined thickness of back-splash tile 48 and the mud 50, or similar adhesive, used to secure the tile, as in FIGURE 3.

The counter facing or top may vary as indicated above and is illustrated herein by the finish tile 52 applied to the counter base 32 and over the adapter 10, being secured by conventional adhesive mud 50, the periphery of the tile around fixture 30 being shown finished with quarter round molding 54 in the usual manner. The center sleeve 24 holds the spout 56 and its associated piping, as in FIGURE 3, while the side sleeves 26 hold faucets 58, as in FIGURE 4, said sleeves extending through the tile and being concealed by the decorative flanges or caps of the fixtures. The particular type of fixtures and their plumbing is immaterial, those illustrated being merely exemplary. Similarly, the arrangement of tiling is only one example to illustrate the function of the adapter.

Figure 6:
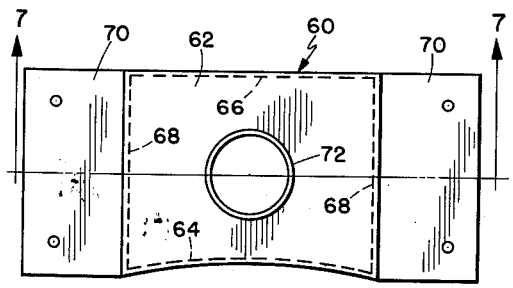
FIGURE 6 is a top plan view of a simple form of the adapter.
Figure 7:
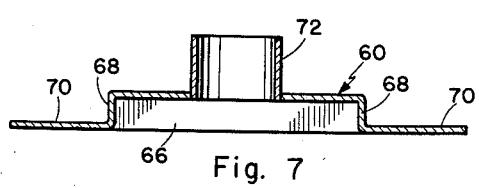
FIGURE 7 is a sectional view taken on the line 7—7 of FIGURE 6.

A particularly useful modification of the adapter is illustrated in FIGURES 6 and 7, this being a shortened adapter 60 having a top plate 62, front flange 64, rear flange 66, end flanges 68 with extended attachment plates 70, but with a single sleeve 72. The adapter 60 is used in the manner described above but is for use with a single faucet or the like.

The adapter, in addition to providing accommodation for the plumbing fixtures and serving as a form and support for mud and tiling, may also be used as a locating or template means when installing the fixture 30. Usually the location of the fixtures must be measured carefully to ensure adequate clearance from the rear wall for manual operation of the faucets. By placing the adapter in position against the wall, with or without the spacing clips 42, as required, the location of the notch 36 and alignment of the plumbing is readily determined.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. A combination form and adapter for faucet installation on a counter between a lavatory fixture and a wall and to support tile surrounding the installation, comprising: a generally flat top plate having a downwardly extending skirt; said skirt including a front skirt portion shaped to conform to the rear edge of the lavatory fixture, a rear flange, and end flanges; fixed attachment plates extending laterally from the lower edges of said end flanges for attachment to a supporting surface; said top plate having at least one aperture and a cylindrical sleeve projecting upwardly therefrom and aligned with said aperture.

2. A combination form and adapter for faucet installation on a counter between a lavatory fixture and a wall and to support tile surrounding the installation, comprising: a generally flat top plate having a downwardly extending skirt; said skirt including a front skirt portion shaped to conform to the rear edge of the lavatory fixture, a rear flange, and end flanges; fixed attachment plates extending laterally from the lower edges of said end flanges for attachment to a supporting surface; said top plate having at least one aperture and a cylindrical sleeve projecting upwardly therefrom and aligned with said aperture; and a pair of spacing clips secured to said rear flange, said clips having rearwardly extending, wall engaging tabs; said tabs being of sufficient length to provide space for a tile and retaining adhesive between said rear flange and the wall.

3. A combination form and adapter for faucet installation on a counter between a lavatory fixture and a wall and to support tile surrounding the installation, comprising: a generally flat top plate having a downwardly extending skirt; said skirt including a front skirt portion shaped to conform to the rear edge of the lavatory fixture, a rear flange, and end flanges; fixed attachment plates extending laterally from the lower edges of said end flanges for attachment to a supporting surface; said top plate having three apertures, a cylindrical central sleeve and a pair of cylindrical side sleeves spaced therefrom; said sleeves being fixed in and projecting upwardly from said top plate in selective alignment with said apertures.

References Cited in the file of this patent

UNITED STATES PATENTS

| | | |
|---|---|---|
| 1,835,301 | Hennessey | Dec. 8, 1931 |
| 2,619,828 | Wiesmann | Dec. 2, 1952 |
| 2,635,253 | Kirvay | Apr. 21, 1953 |
| 2,661,483 | Tortorice | Dec. 8, 1953 |
| 2,872,246 | Zierden | Feb. 3, 1959 |